(12) United States Patent
Kasuya et al.

(10) Patent No.: US 8,715,125 B2
(45) Date of Patent: May 6, 2014

(54) FRICTION-PLATE LUBRICATING DEVICE FOR AUTOMATIC TRANSMISSION

(75) Inventors: Satoru Kasuya, Nishio (JP); Masashi Kito, Anjo (JP); Yuichi Seki, Okazaki (JP); Ryosuke Kondo, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 261 days.

(21) Appl. No.: 13/353,945

(22) Filed: Jan. 19, 2012

(65) Prior Publication Data

US 2012/0211322 A1 Aug. 23, 2012

(30) Foreign Application Priority Data

Feb. 23, 2011 (JP) ................................. 2011-037170

(51) Int. Cl.
*F16H 15/50* (2006.01)
(52) U.S. Cl.
USPC .......................................................... 475/115
(58) Field of Classification Search
USPC ........ 475/115; 192/170.12, 70.11, 66.1, 30 R
See application file for complete search history.

(56) References Cited

U.S. PATENT DOCUMENTS 2,913,932 A * 11/1959 Oehrli ............................ 475/115
4,630,494 A * 12/1986 Kemper ......................... 475/115

FOREIGN PATENT DOCUMENTS

| JP | Y1-45-017480 | 7/1970 |
| JP | A-08-247264 | 9/1996 |
| JP | A-2002-031217 | 1/2002 |
| JP | A-2007-056909 | 3/2007 |
| JP | A-2010-117006 | 5/2010 |

OTHER PUBLICATIONS

Mar. 19, 2012 Search Report issued in International Application No. PCT/JP2012/051339 (with translation).

* cited by examiner

*Primary Examiner* — David D Le
*Assistant Examiner* — David J Hlavka
(74) *Attorney, Agent, or Firm* — Oliff PLC

(57) ABSTRACT

A friction-plate lubricating device for an automatic transmission that includes a friction engagement element with a plurality of friction plates in which outer friction plates and inner friction plates are alternately disposed; a hub with splines engaged with teeth formed on an inner circumference of the inner friction plates, the hub having the splines on an outer circumference thereof and having uneven portions formed on an inner circumference thereof; and a nozzle that discharges lubricant to the uneven portions. Recesses of the uneven portions serve as oil reservoirs in which the lubricant gathers, and through-holes are formed in bottom surfaces of the recesses. The lubricant discharged from the nozzle is collected in the oil reservoirs formed by the recesses so as to be supplied to the plurality of friction plates of the friction engagement element through the through-holes.

6 Claims, 5 Drawing Sheets

F I G . 2

|   | C-1 | C-2 | C-3 | B-1 | B-2 |
|---|---|---|---|---|---|
| P |   |   |   |   |   |
| Rev |   |   | ○ |   | ○ |
| N |   |   |   |   |   |
| 1st | ○ |   |   |   | ○ |
| 2nd | ○ |   |   | ○ |   |
| 3rd | ○ |   | ○ |   |   |
| 4th | ○ | ○ |   |   |   |
| 5th |   | ○ | ○ |   |   |
| 6th |   | ○ |   | ○ |   |

FRICTION-PLATE LUBRICATING DEVICE FOR AUTOMATIC TRANSMISSION

INCORPORATION BY REFERENCE

The disclosure of Japanese Patent Application No. 2011-037170 filed on Feb. 23, 2011 including the specification, drawings and abstract is incorporated herein by reference in its entirety.

BACKGROUND OF THE INVENTION

The present invention is preferably applied to automatic transmissions, in particular, automatic transmissions used for hybrid drive systems having engines and electric motors as driving sources, and specifically related to friction-plate lubricating devices that supply lubricant to a plurality of friction plates of friction engagement elements such as brakes for the automatic transmissions.

DESCRIPTION OF THE RELATED ART

Friction-plate lubricating devices that directly supply lubricant from injection ports (nozzles) to a plurality of friction plates of the wet-type used for clutches or brakes (friction engagement elements) in automatic transmissions have been devised (for example, Japanese Patent Application Publication No. JP-A-2007-56909). In Japanese Patent Application Publication No. JP-A-2007-56909, injection ports for lubricant are disposed at a side of a counter drive gear opposite to that on which the plurality of friction plates (friction plates of multi-plate clutch) lie. While a vehicle is stopped and the engine runs idle with the drive range selected, it is preferable that at least one friction engagement element (for example, a forward clutch) in an automatic transmission slides (slightly engaged state) so as to absorb the difference between the rotation of an input shaft and that of an output shaft. Since the counter drive gear is stopped while the vehicle is stopped, a sufficient amount of lubricant is supplied to the plurality of friction plates from the injection ports through through-holes of the drive gear, and the supply of the lubricant from the injection ports is prevented by the rotating counter drive gear while the vehicle travels.

SUMMARY OF THE INVENTION

In the friction-plate lubricating device described in Japanese Patent Application Publication No. JP-A-2007-56909, the lubricant is supplied from the injection ports through the through-holes of the counter drive gear to the outermost retaining (end) plate part in the plurality of friction plates. Therefore, it is difficult to uniformly supply the lubricant to the plurality of friction plates, and, in particular, it is difficult to spread a sufficient amount of lubricant to a far side of the plurality of friction plates remote from the injection ports.

A hybrid drive system, provided with an electric motor in addition to an engine as driving sources and transmitting power from the driving sources to driving wheels via an automatic transmission, is started by the drive of the electric motor, and the engine is started by the torque of the electric motor as required. The torque of the electric motor needs to be increased in order to start the engine, and it is preferable that predetermined friction engagement elements in the automatic transmission slide so as to absorb variations in the torque at the engine start-up so that the variations in the torque are prevented from being transmitted to the wheels. In this hybrid drive system, the control of sliding the predetermined friction engagement elements at the engine start-up needs to be frequently performed for a relatively long period of time. Even when the friction-plate lubricating device, including the injection ports that eject the lubricant while being pointed to the outermost part of the plurality of friction plates, is applied, a sufficient amount of lubricant may not be supplied to the plurality of friction plates in a uniform manner, in particular, throughout the length and over the entire circumference thereof, and thereby the durability of the friction plates may be affected.

Thus, an object of the present invention is to provide a friction-plate lubricating device for an automatic transmission capable of uniformly supplying lubricant to a plurality of friction plates and thereby solving the above-described problem.

According to a first aspect of the present invention, a hub has splines formed on an outer circumference thereof and uneven portions formed on an inner circumference thereof, recesses of the uneven portions serve as oil reservoirs for lubricant supplied from a nozzle to the uneven portions, and the lubricant is supplied to a plurality of friction plates of a friction engagement element through through-holes formed in the bottom surfaces of the recesses. Accordingly, the lubricant can be substantially uniformly supplied to the plurality of friction plates, and the plurality of friction plates can be accurately controlled while the durability thereof is also ensured during, for example, slip control and slight engagement. At the same time, the lubricant can be appropriately supplied to the plurality of friction plates only when needed, resulting in a reduction in drag torque.

According to a second aspect of the present invention, each recess of the uneven portions has the plurality of through-holes formed in the bottom surface thereof in the axial direction. Accordingly, the lubricant can be substantially uniformly supplied over the entire circumference of the plurality of friction plates and throughout the length of the plurality of friction plates in the axial direction.

According to a third aspect of the present invention, a sleeve is disposed on the inner circumference side of the hub, and the lubricant is supplied from the nozzle to the predetermined gap between the hub and the sleeve. Accordingly, the lubricant can be retained in the oil reservoirs formed of the recesses, and can be reliably supplied to the plurality of friction plates even when, for example, the centrifugal force does not act sufficiently due to low rotation of the hub.

According to a forth aspect of the present invention, a planetary gear lubricated by the lubricant from a lubricant path formed in a shaft is disposed on the inside diameter side of the sleeve. Although the lubricant from the planetary gear is scattered to the plurality of friction plates located on the outside diameter side of the planetary gear, and in addition, although the amount of lubricant supplied from the planetary gear changes due to, for example, the number of revolutions of the shaft, the sleeve prevents the scattered lubricant from splashing the plurality of friction plates. Consequently, the lubricant, whose flow rate changes, from the planetary gear is prevented from being supplied to the plurality of friction plates that requires sliding control with high accurate during, for example, slip control and slight engagement, and the lubricant from the nozzle is supplied to the plurality of friction plates with a high and stable reliability.

According to a fifth aspect of the present invention, an end of the sleeve protrudes from an end of the hub, and the lubricant is ejected from the nozzle toward the space on the outside diameter side of the protruding sleeve. Accordingly, the lubricant from the nozzle can be supplied to the relatively narrow predetermined gap substantially reliably without leaking to the outside, and can be highly efficiently supplied to the plurality of friction plates without being wasted.

According to a sixth aspect of the present invention, when a hybrid drive system including the automatic transmission and an electric motor starts an engine using the electric motor, the slip control is performed on a brake engaged in a first speed position such that the difference between the rotation of an input unit and that of an output unit is absorbed, and the lubricant is uniformly supplied to the plurality of friction plates of the brake under the slip control. With this, the engine can be reliably and accurately started, and shocks at the start-up can be reduced. In addition, the lubricant is supplied to the brake in synchronization with timings of the slip control, that is, the lubricant is supplied to the brake only when needed. This prevents the lubricant from being wasted, and leads to an improvement in fuel economy performance.

BRIEF DESCRIPTION OF THE DRAWINGS

FIG. 2 is an engagement table of the automatic transmission;

DETAILED DESCRIPTION OF THE EMBODIMENTS

Figure 1:
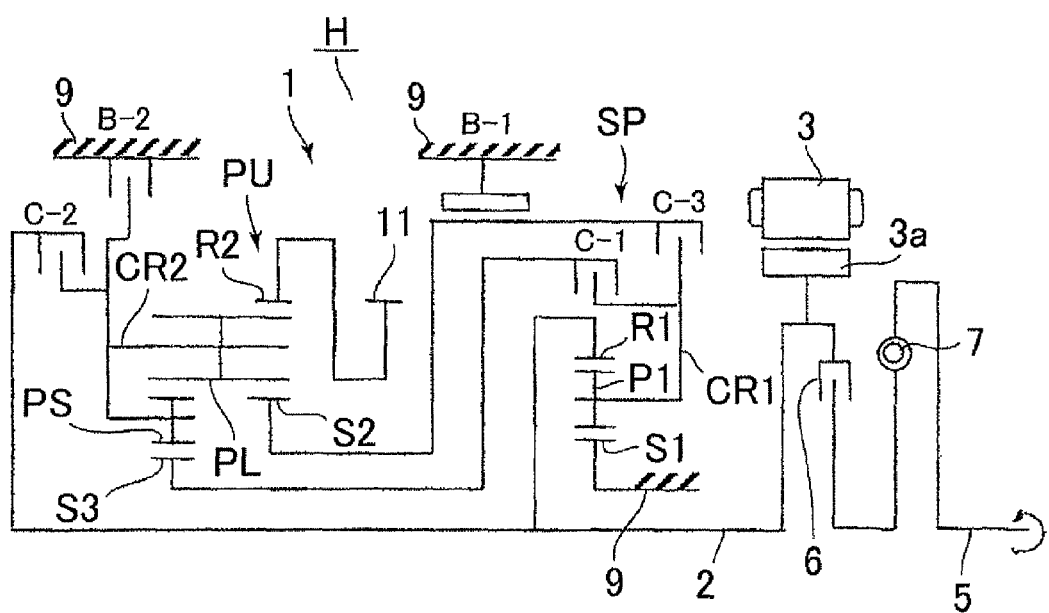
FIG. 1 is a skeleton diagram illustrating an automatic transmission according to the present invention.

An embodiment of the present invention will now be described with reference to the drawings. As shown in FIG. 1, an input shaft 2 of an automatic transmission 1 is linked to a rotor 3a of an electric motor 3, and a clutch 6 and a torsion damper 7 are disposed between the shaft of the rotor 3a and an engine output shaft 5. Therefore, the automatic transmission 1 is applied as a hybrid drive system H of the one-motor type. The electric motor 3 functions as a vehicle driving source, as a starter (cell motor) that drives an engine, and as an alternator (generator) that converts the power of the engine or the inertial force of the vehicle into electrical energy. The clutch 6 and the torsion damper 7 disposed between the input shaft 2 and the engine output shaft 5 may be replaced with a torque converter with a lockup clutch. In this case, the lockup clutch carries out the function of the clutch 6.

The input shaft 2 of the automatic transmission 1 is disposed so as to be coaxial with the electric motor 3, the clutch 6, and engine output shaft 5. A planetary gear SP and a planetary gear unit PU are connected to the input shaft 2. The planetary gear SP is a so-called single-pinion planetary gear including a sun gear S1, a carrier CR1, and a ring gear R1, and the carrier CR1 has a pinion P1 meshing with the sun gear S1 and the ring gear R1.

The planetary gear unit PU is a so-called planetary gear of the Ravigneaux type including a sun gear S2, a sun gear S3, a carrier CR2, and a ring gear R2 as four rotational elements, and the carrier CR2 has a long pinion PL meshing with the sun gear S2 and the ring gear R2 and to a short pinion PS meshing with the sun gear S3 while the long pinion PL and the short pinion PS mesh with each other.

The sun gear S1 in the planetary gear SP is connected to a boss (not shown) integrally fixed to a transmission case 9, and the rotation of the sun gear S1 is fixed. The rotation of the ring gear R1 is the same as that of the input shaft 2 (hereinafter referred to as "input rotation"). The rotation of the carrier CR1 is a decelerated rotation that decelerates the input rotation due to the sun gear S1 whose rotation is fixed and the ring gear R1 that rotates with the input rotation. The carrier CR1 is connected to a clutch C-1 and a clutch C-3.

The sun gear S2 in the planetary gear unit PU is connected to a brake B-1, and can be fixed with respect to the transmission case 9. In addition, the sun gear S2 is connected to the clutch C-3, and the decelerated rotation of the carrier CR1 can be input to the sun gear S2 via the clutch C-3. The sun gear S3 is connected to the clutch C-1, and the decelerated rotation of the carrier CR1 can be input to the sun gear S3.

The carrier CR2 is connected to a clutch C-2 to which the rotation of the input shaft 2 is input, and the input rotation can be input to the carrier CR2 via the clutch C-2. In addition, the carrier CR2 is connected to a brake (friction engagement element) B-2, and the rotation of the carrier CR2 can be fixed via the brake B-2. The ring gear R2 is connected to a counter gear 11, and the counter gear 11 is connected to driving wheels (not shown) via a counter shaft (not shown) and a differential gear (not shown).

Figure 2:
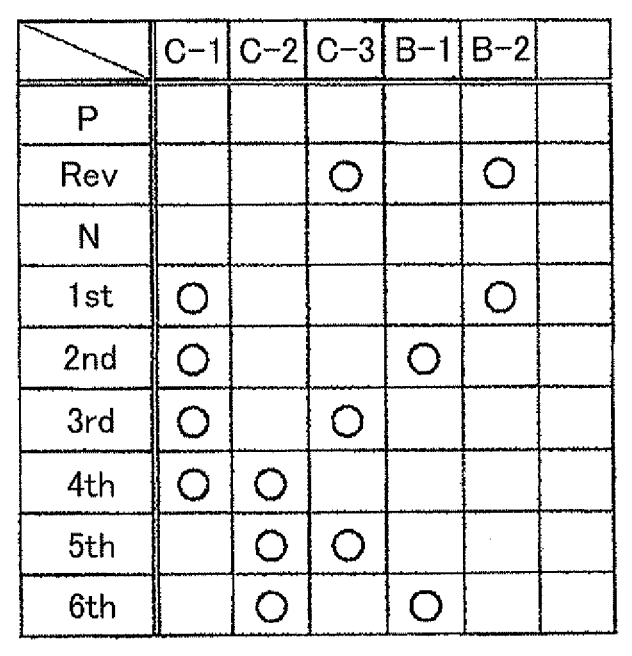

The automatic transmission 1 having the above-described structure achieves first (1st) to sixth (6th) forward speeds and a reverse speed (Rev) by engaging or disengaging the clutches C-1 to C-3 and the brakes B-1 and B-2 shown in a skeleton diagram in FIG. 1 in accordance with combinations shown in an engagement table in FIG. 2.

The brake B-2 is actuated in the first speed position and in the reverse speed position. The brake B-2 is engaged at start-up, and slip control is performed on the brake when the electric motor 3 starts the engine. That is, the vehicle is put into a first speed state when both the clutch C-1 and the brake B-2 are engaged. In the first speed state, the rotation of the input shaft 2 is transmitted to the sun gear S3 in the planetary gear PU while being decelerated by the engagement of the clutch C-1. The rotation output from the ring gear R2 to the counter gear 11 is further decelerated since the carrier CR2 is stopped by the brake B-2. When the vehicle starts in the first speed position, the vehicle is driven by the electric motor 3 since the clutch 6 is usually disengaged and the engine is stopped.

The engine (FIG. 1 shows the output shaft 5) is started in the first speed state after the vehicle starts. At this moment, the slip control is performed on the brake B-2 such that the carrier CR2 rotates and thereby absorbs a difference between the rotation of the sun gear S3 and that of the ring gear R2.

The engine is started by increasing the torque of the electric motor 3 and by engaging the clutch 6 while the difference between the rotation of the input shaft and that of the output shaft is absorbed by the slip control of the brake B-2.

Figure 3:
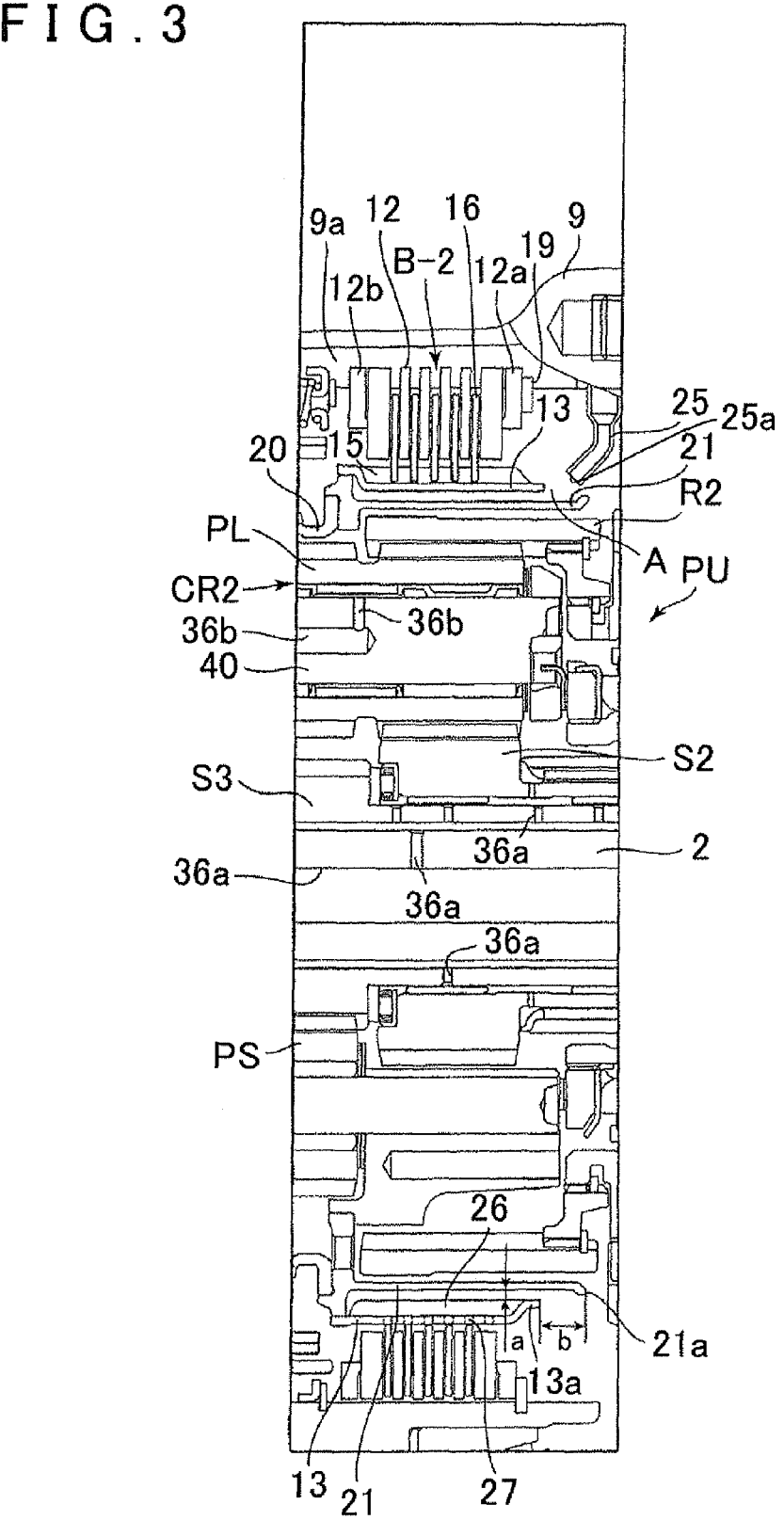
FIG. 3 is a cross-sectional view cut at a part including a friction-plate lubricating device according to the present invention in the automatic transmission.

FIG. 3 is a partial view illustrating the brake B-2 on which the slip control is performed. The brake (friction engagement element) B-2 includes a plurality of friction plates 12, 16. The plurality of friction plates includes outer friction plates (brake plates) 12 having teeth that are formed on the outer circumference thereof and that engage with inner splines 9a on the case 9 and inner friction plates (brake discs) 16 having teeth that are formed on the inner circumference thereof and that engage with splines 15 on a hub 13, the outer friction plates 12 and the inner friction plates 16 being alternately disposed in an axial direction. An end plate 12a retained by a snap ring 19 is disposed at an end of the outer friction plates 12, and a pressure plate 12b is disposed at an end of the outer friction plates 12 on the side of a hydraulic piston.

The hub 13 is integrally fixed to a case 20 of the carrier CR2 by, for example, welding. The pinions PL and PS of the carrier CR2 are disposed inside the case 20, and the ring gear R2 and the sun gears S2 and S3 mesh with the pinions. A sleeve 21 is integrally fixed to the carrier case 20 with a predetermined gap a interposed between the sleeve 21 and the hub 13 inside the hub 13, and the predetermined gap a is closed at ends of the hub 13 and the sleeve 21 where the hub 13 and the sleeve 21 are fixed. That is, the hub 13 and the sleeve 21 are formed of coaxially disposed cylindrical members, and the outside hub 13 and the inside sleeve 21 extend parallel to each other in the axial direction. An end 21a of the sleeve 21 protrudes from an end 13a of the hub 13 by a predetermined length b, and is slightly bent outward in radial directions. A nozzle 25 that ejects lubricant is disposed at a predetermined position in the case 9 such that the injection port 25a of the nozzle 25 faces a space A having the predetermined length b so as to discharge the lubricant into the gap a between the hub 13 and the sleeve 21.

That is, the carrier CR2, the ring gear R2, and the sun gears S2 and S3 that structure the planetary gear PU are disposed on the inside diameter side of the sleeve 21, and the planetary gear PU is lubricated by the lubricant from lubricant paths 36a and 36b formed in, for example, the input shaft 2 and a long pinion shaft 40.

Figure 4A:
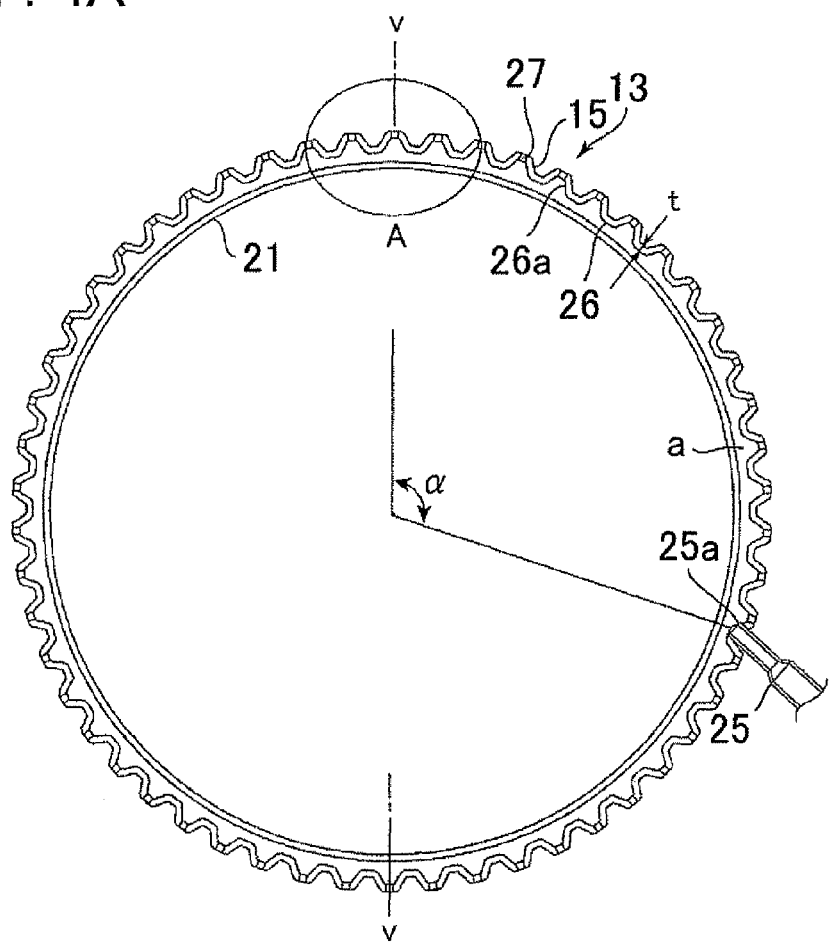
FIG. 4A is a cross-sectional view of the friction-plate lubricating device viewed from the front.
Figure 4B:
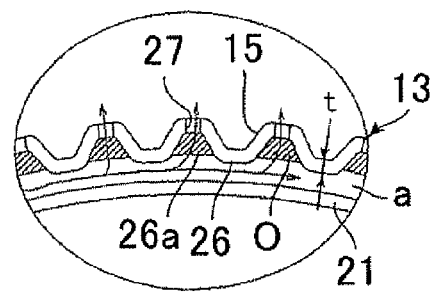
FIG. 4B is an enlarged view thereof.

As shown in FIG. 4A, the hub 13 has the splines 15 shaped by a press die of a predetermined thickness t, and the projections and recesses on the outer circumference of the hub 13 serve as the splines 15 that engage with the teeth of the inner friction plates 16. At the same time, similar uneven portions 26 are formed on the inner circumference of the hub 13 over the entire circumference of the hub 13 in the axial direction. Each recess 26a of the uneven portion 26 has a large number of small holes (through-holes) 27 for through the bottom surface thereof at regular intervals in the axial direction. As shown in FIG. 4B, the recesses 26a serve as oil reservoirs in which lubricant O gathers, and the lubricant O in the oil reservoirs 26a is supplied to the plurality of friction plates 12 and 16 of the brake B-2 through the small holes 27. As shown in FIG. 3, the end 13a of the hub is bent so as to be annular flanged portions that cover ends of the recesses 26a serving as the oil reservoirs.

The nozzle 25 is disposed at a predetermined angular position α, for example, in a range of 100° to 120°, and preferably in a range of 105° to 112° in a positive direction (rotation direction when the vehicle moves forward) of the hub 13 with respect to a diameter (vertical) line v-v.

Figure 5:
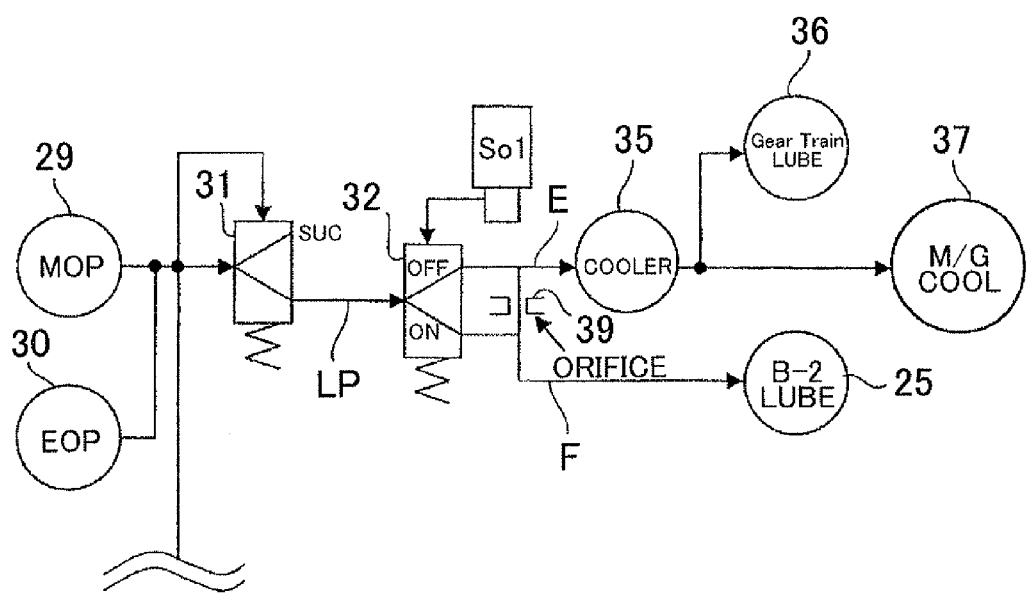
FIG. 5 is a circuit diagram of the friction-plate lubricating device.

As shown in FIG. 5, a hydraulic circuit includes a mechanical oil pump 29 and an electric oil pump 30 that are driven in conjunction with the input shaft (or the engine output shaft) 2 of the automatic transmission 1, and the hydraulic pressure generated by these pumps is adjusted to a lubricant pressure LP by a regulator valve 31 controlled by an electric signal SUC from a controller. A valve 32, switched by a solenoid valve So1, switches the lubricant pressure LP between an oil path E to an oil cooler 35 and an oil path F for lubricating the brake B-2 guided to the nozzle 25. The switching valve 32 supplies the lubricant from the oil path E to a lubricating path 36 for a gear train of the automatic transmission 1 and a lubricating path 37 for cooling the electric motor 3 through the oil cooler 35 when the solenoid valve So1 is turned off, and supplies the lubricant to the nozzle 25 for lubricating the brake B-2 through the oil path F for lubricating the brake B-2 when the solenoid valve So1 is turned on. The solenoid valve So1 is turned on in conjunction with an electric signal indicating that the controller performs the slip control of the brake B-2, for example, a signal indicating energization of an ignition coil for starting the engine and connection of the clutch 6. The oil path E to the oil cooler and the oil path F for lubricating the brake B-2 communicate with each other through an orifice 39.

Since the friction-plate lubricating device has the above-described structure, the mechanical oil pump 29 generates the hydraulic pressure while the vehicle travels, and the electric pump 30 generates the hydraulic pressure while the vehicle is stopped. The lubricant pressure adjusted by the regulator valve 31 lubricates the automatic transmission 1 (36) and cools the electric motor 3 (37) while circulating in the oil cooler 35 through the oil path E. At this moment, a small amount of lubricant is supplied to the brake B-2 through the orifice 39. When the engine is actuated in the first speed position of the automatic transmission 1, a predetermined low pressure is supplied to the brake B-2 so that the slip control is performed, and the clutch 6 is engaged so that the engine is started by the electric motor 3. At this moment, the electric motor 3 outputs a predetermined torque and a predetermined number of revolutions such that the engine starts smoothly while the clutch 6 slips. At the same time, the slip control is performed on the brake B-2 such that the different between the rotation of the input shaft and that of the output shaft is absorbed and such that a smooth torque with less start-up shocks is output to the counter gear 11.

Subsequently, the solenoid valve So1 is turned on in synchronization with a timing when the brake B-2 requires the slip control, and the lubricant pressure LP is supplied to the oil path F for lubricating the brake B-2. The lubricant in the oil path F is discharged from the injection port 25a of the nozzle 25 into the space A, and is supplied to the relatively narrow gap a between the hub 13 and the sleeve 21 with very little leakage. The lubricant supplied from the injection port 25a of the nozzle at the predetermined angular position α shown in FIG. 4A gathers in the oil reservoirs formed of the recesses 26a of the uneven portions 26 in the inner circumferential surface of the hub 13 and spreads in the axial direction due to the gravity and the centrifugal force arising from the rotation of the hub 13 and the sleeve 21 based on the slip control. Furthermore, the lubricant sticks to the oil reservoirs 26a due to the centrifugal force, and is gradually discharged from the small holes 27 to the plurality of friction plates 12 and 16. The diameter of the small holes 27 is set such that the oil reservoirs 26a become empty of the lubricant when the hub 13 rotates substantially one revolution during the slip control. Consequently, a sufficient amount of lubricant is substantially uniformly supplied to the plurality of friction plates 12 and 16 of the brake B-2 over the entire circumference thereof and throughout the length thereof in the axial direction. Even when the slip control is frequently performed on the brake for a relatively long period of time the slip control does not affect the durability of the plurality of friction plates 12 and 16, and can be performed without any problems.

At this moment, the recesses 26a serving as the oil reservoirs are covered by the end 13a, and the lubricant O that gathers in the recesses 26a is not scattered from the end even with, for example, the centrifugal force, and the lubricant is highly efficiently supplied to the plurality of friction plates 12 and 16 of the brake B-2 without being wasted. Even when the rotational speed of the hub 13 is low and a sufficient centrifugal force does not act on the lubricant O, the lubricant diffused into the relatively narrow gap a is supplied from the small holes 27 to the plurality of the friction plates 12 and 16 of the brake B-2 without leaking outward from the space A.

During the slip control of the brake B-2, the switching valve 32 is switched to the oil path F for lubricating the brake B-2, and the supply of the lubricant to the lubricant path 36 for the gear train through the oil path E is stopped. However, a sufficient amount of lubricant has been supplied to the lubricant path 36 for the gear train before the supply is stopped, and the lubricant supplied from the lubricant paths 36a and 36b shown in FIG. 3 to the planetary gear PU is kept scattered from the radial oil paths outward in radial directions due to the centrifugal force even during the slip control. The lubricant whose flow rate is changed by, for example, the rotational speeds of the rotating shafts 2 and 40 is blocked by the sleeve 21 disposed so as to cover the outside diameter of the planetary gear PU, and is not supplied to the oil reservoirs 26a between the sleeve 21 and the hub 13. Consequently, only the lubricant from the nozzle 25 through the oil path F is supplied to the brake B-2, and the slip control is performed on the plurality of the friction plates 12 and 16 of the brake B-2 with an appropriate amount of lubricant uniformly spread over the entire circumference thereof and throughout the length thereof.

When the engine start-up is completed, the slip control of the brake B-2 is released, and the solenoid valve So1 is turned off. With this, lubrication of the friction plates with a large amount of lubricant from the nozzle 25 is stopped, and a sufficient amount of lubricant is supplied to the oil path E while a small amount of lubricant is supplied to the brake B-2 through the orifice 39. In this manner, the switching valve 32 is switched to the oil path F for lubricating the brake B-2 so that the friction-plate lubricating device is actuated only when the lubrication is required, for example, only during the slip control. This prevents the lubricant from being wasted, and leads to an improvement in fuel economy.

Although the slip control of the brake B-2 at the engine start-up has been described above, the friction-plate lubricating device may be actuated in a manner similar to that described above when the electric motor 3 is rotated by the engine so as to be charged while the vehicle is stopped. That is, while the vehicle is stopped, in the first speed state, and the brake B-2 is under the slip control (with torque) or in a standby pressure state for start-up. At this moment, a sufficient amount of lubricant is supplied from the nozzle 25 such that the difference between the rotation of the input shaft and that of the output shaft is absorbed by the slip of the brake B-2.

In this embodiment, the sleeve 21 is disposed on the inner circumference side of the hub 13 so that the lubricant is reliably supplied to the friction plates without being scattered. However, the friction-plate lubricating device may not be provided with the sleeve since the lubricant is retained in the oil reservoirs 26a due to the centrifugal force while the hub 13 rotates at, for example, engine start-up. In addition, the friction-plate lubricating device is not limited to the automatic transmission for the hybrid drive system, and may be similarly applied to, for example, the slight engagement state in the automatic transmission having an engine as the only driving source as described in Japanese Patent Application Publication No. JP-A-2007-56909 serving as a related art.

The automatic transmission according to the present invention is suitable for automobiles, in particular, hybrid drive systems having engines and electric motors as driving sources, and may be used for lubricating devices that lubricate a plurality of friction plates of brakes or the like in the automatic transmissions, in particular, a plurality of friction plates of friction engagement elements on which slip control is performed when the engines are started by the electric motors.

What is claimed is:

1. A friction-plate lubricating device for an automatic transmission, the device comprising:
   a friction engagement element including a plurality of friction plates in which outer friction plates and inner friction plates are alternately disposed;
   a hub having splines engaged with teeth formed on an inner circumference of the inner friction plates, the hub having the splines on an outer circumference of the hub and has uneven portions formed on an inner circumference of the hub; and
   a nozzle that discharges lubricant to the uneven portions is provided; wherein:
   recesses of the uneven portions serve as oil reservoirs in which the lubricant gathers, and through-holes are formed in bottom surfaces of the recesses; and
   the lubricant discharged from the nozzle is collected in the oil reservoirs formed of the recesses so as to be supplied to the plurality of friction plates of the friction engagement element through the through-holes.

2. The friction-plate lubricating device for the automatic transmission according to claim 1, wherein
   each recess of the uneven portions has the plurality of through-holes formed in the bottom surface thereof in an axial direction, and
   the lubricant is supplied through the through-holes over the entire circumference of the plurality of friction plates and throughout the length of the plurality of friction plates in the axial direction.

3. The friction-plate lubricating device for the automatic transmission according to claim 1, wherein
   a sleeve is disposed on an inner circumference side of the hub with a predetermined gap interposed therebetween so as to be integrated with the hub, and
   the lubricant is supplied from the nozzle to the predetermined gap between the hub and the sleeve.

4. The friction-plate lubricating device for the automatic transmission according to claim 3, wherein
   a planetary gear is disposed on an inside diameter side of the sleeve, and
   the planetary gear is lubricated by lubricant from a lubricant path formed in a shaft.

5. The friction-plate lubricating device for the automatic transmission according to claim 3, wherein
   the hub and the sleeve are integrally fixed to each other at first ends thereof such that the predetermined gap is closed, and a second end of the sleeve protrudes from a second end of the hub by a predetermined length, and
   the nozzle is disposed so as to eject the lubricant to a space on an outside diameter side of the sleeve protruding by the predetermined length.

6. The friction-plate lubricating device for the automatic transmission according to claim 1, wherein
   an electric motor and a clutch are disposed on a side of an input shaft of the automatic transmission on the side close to an engine output shaft,
   the friction engagement element is a brake that is engaged at least when the automatic transmission is in a first speed position,
   slip control is performed on the brake such that a difference between a rotation of an input unit and a rotation of an output unit of the automatic transmission is absorbed when the engine is started by the electric motor, and
   the lubricant is discharged from the nozzle in synchronization with a timing of the slip control of the brake.

* * * * *